(12) United States Patent
Wu et al.

(10) Patent No.: US 9,007,754 B2
(45) Date of Patent: Apr. 14, 2015

(54) DISPLAY MODULE AND MANUFACTURING METHOD THEREOF

(75) Inventors: Chia-Hao Wu, Hsin-Chu (TW);
Han-Ping Kuo, Hsin-Chu (TW);
Chun-Yuan Chen, Hsin-Chu (TW);
Chih-Chun Chang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 193 days.

(21) Appl. No.: 13/537,490

(22) Filed: Jun. 29, 2012

(65) Prior Publication Data

US 2013/0010411 A1 Jan. 10, 2013

(30) Foreign Application Priority Data

Jul. 8, 2011 (TW) .............................. 100124191 A

(51) Int. Cl.
*H05K 7/00* (2006.01)
*G09F 9/30* (2006.01)
*G09F 13/04* (2006.01)
*G02F 1/1333* (2006.01)
*G02F 1/1335* (2006.01)

(52) U.S. Cl.
CPC *G09F 9/30* (2013.01); *G09F 13/04* (2013.01); *G02F 1/133308* (2013.01); *G02F 1/133608* (2013.01); *G02F 2202/28* (2013.01)

(58) Field of Classification Search
CPC .................................. H05K 7/00; B32B 37/12
USPC .............................. 361/679.21, 679; 264/261
See application file for complete search history.

(56) References Cited

U.S. PATENT DOCUMENTS

| 6,498,631 | B2 * | 12/2002 | Natsuyama | 349/62 |
| 6,930,734 | B2 * | 8/2005 | Lee | 349/58 |
| 6,950,154 | B2 * | 9/2005 | Lee | 349/58 |
| 7,599,016 | B2 * | 10/2009 | Lo et al. | 349/56 |

(Continued)

FOREIGN PATENT DOCUMENTS

| CN | 1584690 A | 2/2005 |
| CN | 201051198 Y | 4/2008 |

(Continued)

OTHER PUBLICATIONS

English translation of abstract of CN 201051198 Y (published Apr. 23, 2008).

(Continued)

*Primary Examiner* — Dion R Ferguson
*Assistant Examiner* — Mandeep Buttar
(74) *Attorney, Agent, or Firm* — McClure, Qualey & Rodack, LLP

(57) ABSTRACT

A display module includes a first housing, a second housing, a display panel, and a glue. The first housing is disposed on the second housing and has a metal sidewall. A first gap exists between the metal sidewall and a sidewall of the first housing. The display panel is disposed on the first housing and has a side surface facing the sidewall, wherein a second gap exists between the side surface and the inner surface. The glue fills the second gap. A manufacturing method of the display module includes disposing the second housing on the first housing and forming the first gap; providing the glue on the inner face of the sidewall and above the first gap; making the display panel push and graze the glue; disposing the display panel on the first housing and forming the second gap, wherein the glue fills the second gap.

14 Claims, 15 Drawing Sheets

(56) References Cited

U.S. PATENT DOCUMENTS

| | | |
|---|---|---|
| 2002/0008806 A1 | 1/2002 | Natsuyama |
| 2002/0191131 A1* | 12/2002 | Ota et al. .................. 349/110 |
| 2003/0043310 A1* | 3/2003 | Cho .............................. 349/58 |
| 2003/0218702 A1* | 11/2003 | Kwon et al. .................. 349/65 |
| 2007/0057541 A1* | 3/2007 | Huang ...................... 297/217.3 |
| 2007/0188675 A1* | 8/2007 | Tsubokura et al. ............ 349/58 |
| 2008/0198627 A1 | 8/2008 | Matsumoto |
| 2009/0033826 A1 | 2/2009 | Shimizu |
| 2011/0235364 A1* | 9/2011 | Lo et al. .................... 362/611 |

FOREIGN PATENT DOCUMENTS

| | | | |
|---|---|---|---|
| CN | 101251678 A | | 8/2008 |
| CN | 101359119 A | | 2/2009 |
| KR | 2001063793 A | * | 7/2001 |
| TW | 201104305 | | 2/2011 |

OTHER PUBLICATIONS

English translation of abstract of CN 1584690 A (published Feb. 23, 2005).

China Office Action dated Oct. 12, 2012.

English translation of abstract of TW 201104305.

* cited by examiner

DISPLAY MODULE AND MANUFACTURING METHOD THEREOF

BACKGROUND OF THE INVENTION

1. Field of the Invention

The present invention generally relates to a display module and a manufacturing method thereof.

2. Description of the Prior Art

Display module is extensively used in a variety of display devices, wherein the up-to-date display devices such as smart phones or portable internet devices greatly have the touch interface instead of the conventional keys. To cope with the increasing popularity of touch interface, the display area of the display panel becomes larger and larger and the slim frame design is accordingly developed.

The conventional display module 1' as shown in FIG. 1A includes a frame body 2', a backlight module 3', and a display panel 4', wherein the backlight module 3' is disposed in the frame body 2'; the display panel 4' is disposed on the frame body 2' and is fixed thereto by a double sided tape 6' in "□" shape, for example. In addition, the frame body 2' is made of plastic and constitutes the display module 1' having a wider frame margin. FIG. 1B shows a display module 1 having a narrower frame margin, wherein the display module 1 has a frame body 2 with a podium 23 to meet the requirement of a narrower frame margin design. Furthermore, in place of the conventional double sided tape 6' which has weaker stickiness, glue 6 is used to improve the fixation of the display panel 4 and the frame body 2.

However, in order to match up a larger display area 41 of the display panel 4 and the narrow margin design, the black frame 45 of the display panel 4 becomes smaller and smaller, resulting in a reduced distance D between the edge of the light guide plate and optical films of the backlight module 3 and the edge of the display area 41. That is, the edge of the light guide plate is closer to the display area 41. Consequently, compared with the display module 1' with a wider margin design and a larger black frame 45' shown in FIG. 1A, the distance D of the display module 1 is smaller than the distance D', causing the leakage of large angle light to occur more easily. That is, light on the light path "a" or "b" will be received by the viewer as a leaked light. In other words, the thickness of the podium 23 limits the space inside the frame body 2 and therefore effects the arrangement of the backlight module 3, i.e. the light guide plate of the backlight module 3 cannot extend further outward, causing the leakage of large angle light to occur. Moreover, due to the limitation to the plastic material, the thickness of the frame body 2 cannot be further reduced.

SUMMARY OF THE INVENTION

It is an object of the present invention to provide a display module having a slim frame design.

It is another object of the present invention to provide a display module having a well-secured display panel.

It is another object of the present invention to provide a display module having a stronger structural strength.

It is another object of the present invention to provide a display module capable of coping with the light leakage problem.

The present invention provides a display module including a back bezel, a frame body, a backlight module, and a display panel. The back bezel includes a base plate and a sidewall surrounding a periphery of the base plate. The frame body is disposed on the back bezel and has a bottom and a metal sidewall surrounding a periphery of the bottom. The metal sidewall extends along an inner surface of the sidewall, wherein a first gap exists between the metal sidewall and the inner surface of the sidewall for accommodating a portion of a glue. The back bezel and the frame body are both made of metal and together constitute a slim frame margin of the display module.

The backlight module is disposed inside the frame body and has a light-exit surface. A display panel is disposed on the frame body with a display surface facing away from the light-exit surface. The frame body has a top surface at the side opposite to side of the metal sidewall connecting to the bottom, wherein the display panel disposed on the frame body contacts with the top surface of the metal sidewall. In addition, the display panel includes a bottom surface and a side surface adjacent to the bottom surface, wherein the side surface of the display panel and the edge of the bottom surface stick out of the top surface. The area of the bottom surface of the display panel is greater than an opening of the frame body so that the frame body is completely within the projection area of the display panel.

The display panel and the frame body are together disposed on the back bezel, wherein at least a portion of the side surface of the display panel faces the inner surface of the sidewall, so that a second gap exist between the side surface and the inner surface of the sidewall. The second gap communicates with the first gap; both of the first gap and the second gap are provided for accommodating a glue. The width of the second gap is smaller than the width of the first gap. Furthermore, when the glue is provided, the glue fills the second gap and the first gap and therefore secures the frame body on the back bezel.

Except being secured on the back bezel together with the display panel, the frame body may be secured independently on the back bezel. The base plate of the back bezel includes at least a first positioning hole while the bottom of the frame body includes at least a second positioning hole. The first positioning hole and the second positioning hole are configured to position the frame body on the back bezel. Furthermore, the frame body can be secured on the back bezel by adhering, welding, or fastening.

The bottom of the frame body can be configured for securing of the frame body or accommodating the backlight module within the frame body. The bottom includes a first bottom area and a second bottom area, wherein the first bottom area rises in a direction away from the base plate to form a first space with the base plate; the second bottom area contacts with the base plate of the back bezel. The backlight module disposed in the frame body is supported by the first bottom area and forms a second space with the second bottom area. In addition, a first bonding material is further disposed in the first space to fix the bottom to the base plate while a second bonding material is further disposed in the second space to fix the backlight module to the bottom.

The present invention provides a manufacturing method of the display module, including the steps: disposing the frame body on the back bezel and forming the first gap between the metal sidewall of the frame body and the inner surface of the sidewall of the back bezel; providing the glue on the inner surface of the sidewall and above the first gap; disposing the display panel in the back bezel and enabling the edge of the bottom surface of the display panel to push and graze the glue; placing the display panel on the frame body, enabling the top surface of the metal sidewall to support the display panel, and forming the second gap between the side surface of the display panel and the inner surface of the sidewall, wherein the glue fills the second gap.

DETAILED DESCRIPTION OF THE PREFERRED EMBODIMENT

Figure 1A:
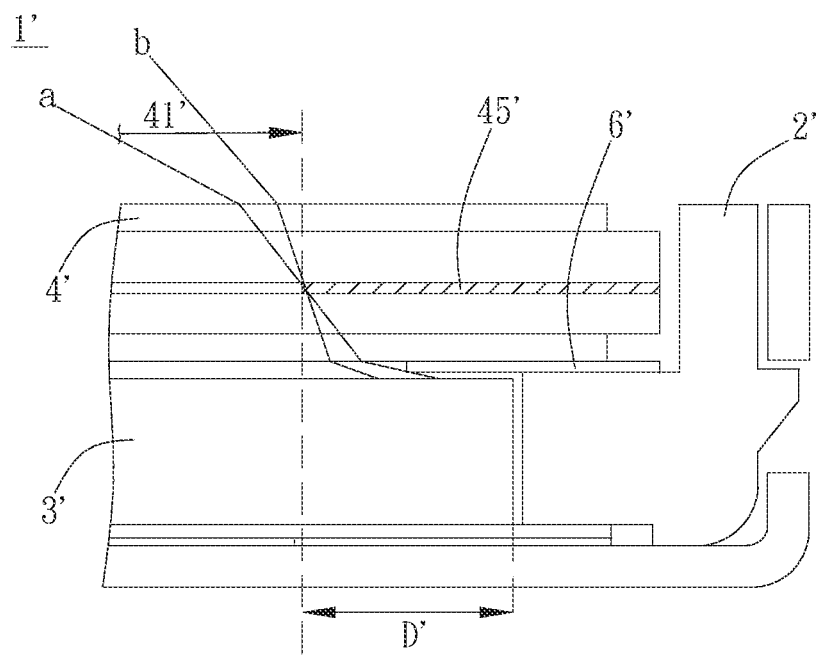
FIGS. 1A-1B show schematic views of the conventional display modules.
Figure 1B:
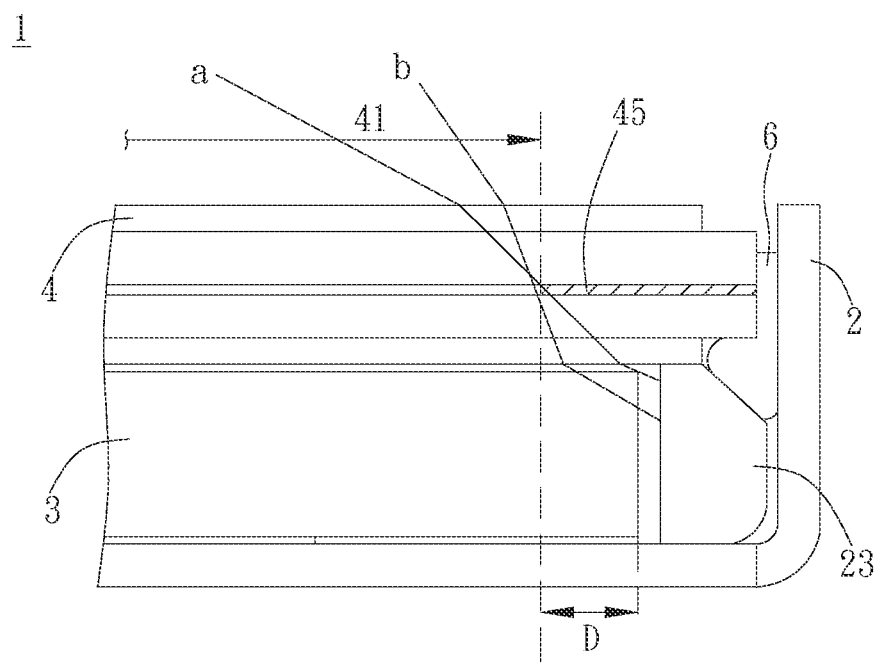

The display module 10 of the present invention includes a first housing 100, a second housing 200, a backlight module 300, and a display panel 400. As the embodiment shown in FIGS. 2A-2B, the first housing 100 can be a back bezel; the second housing 200 can be a frame body. The back bezel 100 includes a base plate 110 and a sidewall 120 surrounding the periphery of the base plate 110. The frame body 200 is disposed on the back bezel 100 and has a metal sidewall 250. The metal sidewall 250 extends along an inner surface of the sidewall 120, wherein a first gap 2500 exists between the metal sidewall 250 and the inner surface of the sidewall 120 for accommodating a portion of glue 60 (described later). The frame body 200 further includes a bottom 230. An outer surface of the bottom 230 faces the base plate 110 and is preferably connected with the base plate 110, wherein the periphery of the bottom 230 is surrounded by the metal sidewall 250 as mentioned above. The bottom 230 and the metal sidewall 250 can be integrally formed. That is, for example, the frame body 200 may be an integrally formed stamping sheet-metal. On the other hand, the back bezel 100 can be made of plastic or metal. However, in the preferred embodiment of the present invention, the back bezel 100 and the frame body 200 are both made of metal and constitute a slim frame of the display module 10. For example, the thickness of the sidewall made of plastic is between 0.35 and 0.4 mm; however, the sidewall made of metal may be reduced to a thickness of 0.15-0.2 mm. Consequently, the increased space inside the frame body 200 of the present invention resulted from the slimmer frame margin improves the arrangement of a backlight module 300. That is, the backlight module 300 can extend further outward. On the other hand, the distance "d" between the backlight module 300 and the display area 410 correspondingly becomes larger, preventing the leakage of large angle light.

Figure 2A:
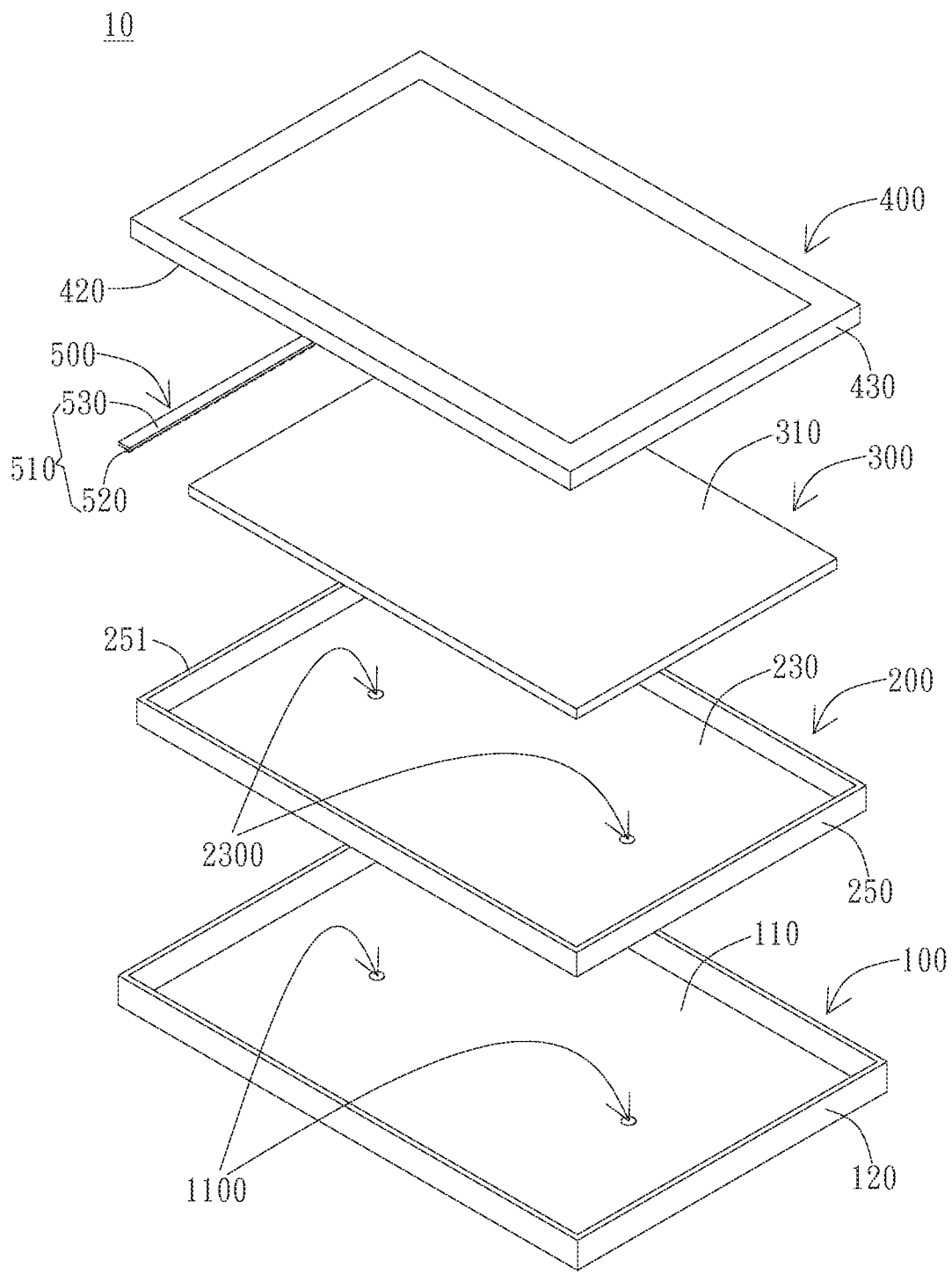
FIGS. 2A-2C are schematic views of the embodiment of the display module of the present invention.

The backlight module 300 of the display module 10 is disposed inside the frame body 200 and has a light-exit surface 310. A display panel 400 is disposed on the frame body 200 in a manner that a display surface 401 faces away from the light-exit surface 310. In addition, a light source module 500 is also disposed inside the frame body 200 and can be a side-emitting light source or a bottom-emitting light source. As FIG. 2C shows, the light source module 500 of the present invention is preferably located between the backlight module 300 and the metal sidewall 250. The light source module 500 preferably includes a light bar 510 extending along the metal sidewall 250. The light bar 510 includes a strip circuit board 530 and a plurality of light sources 520. The strip circuit board 530 may be, for example, a rigid board, a flexible board, or a metal substrate made of materials including aluminum, copper, etc. The plurality of light sources 520 are disposed on the strip circuit board 530 and arranged along the extension direction of the strip circuit board 530. The light source module 500 is preferably disposed at one side of the backlight module 300, instead of around the backlight module 300. Alternatively, the light source module 500 can be disposed at two opposite sides of the backlight module 300. In addition, a shielding tape 550 is disposed on one side of the light bar 510 facing the display panel 400 and covers a portion of the outer surface of the backlight module 300 facing the display panel 400 to reduce light leakage. In other embodiments, the width of the shielding tape 550 is also large enough to cover the area from the top surface 251 of the frame body 200 to the backlight module 300.

As mentioned above, the display panel 400 is disposed on the frame body 200 in a manner that the display surface 401 faces away from the light-exit surface 310. In the preferred embodiment of the present invention, the display panel 400 disposed on the frame body 200 contacts with the top surface 251 of the metal sidewall 250. The top surface 251 is opposite to the side of the metal sidewall 250 connecting to the bottom 230 and is parallel to the bottom 230, wherein the display panel 400 contacts with the top surface 251. In other embodiments, as in the case that the frame body 200 is an integrally formed stamping sheet-metal, the thickness of the stamping sheet-metal is the thickness of the metal sidewall 250. That is, the thickness of the metal sidewall 250 is uniform and equal to the width of the top surface 251 (measured from a direction parallel to the direction of the thickness). In other embodiments, the top surface can be formed by bending the stamping sheet-metal (not shown). That is, the top surface 251 is at the side opposite to the side of the metal sidewall connecting to the bottom and has a thickness equal to the thickness of the stamping sheet-metal, wherein a bending part is formed between the top surface and the metal sidewall. In the circumstance, the size of the top surface is irrelevant to the thickness of the metal sidewall; that is, the extent of the bending determines the size of the top surface. The display panel 400 includes a bottom surface 420 and a side surface 430 adjacent to the bottom surface 420, wherein the area of the bottom surface 420 is greater than an opening of the frame body 200. Particularly, the longer side of the display panel 400 is greater than the longer side of the frame body 200, and the shorter side of the display panel 400 is greater than the shorter side of the frame body 200. The bottom surface 420 of the display panel 400 mentioned above is disposed opposite to the display surface 401 and faces the light-exit surface 310. In addition, the edge portion of the bottom surface 420 of the display panel 400 preferably contacts with the top surface 251 of the metal sidewall 250. Moreover, the side surface 430 of the display panel 400 and the edge of the bottom surface 420 stick out of the top surface 251.

Furthermore, the display panel 400 and the frame body 200 are together disposed on the back bezel 100, wherein at least a portion of the side surface 430 of the display panel 400 faces the inner surface of the sidewall 120, so that a second gap 4300 exists between the side surface 430 and the inner surface of the sidewall 120. The second gap 4300 communicates with the first gap 2500. Both of the first gap 2500 and the second gap 4300 are provided for accommodating the glue 60. On the other hand, because the side surface 430 of the display panel 400 preferably sticks out of the top surface 251, the width of the second gap 4300 is smaller than the width of the first gap 2500.

In the present invention, the glue 60 is disposed between the sidewall 120 and the side surface 430 of the display panel 400, and between the sidewall 120 and the metal sidewall 250. Specifically, the metal sidewall 250, the side surface 430 of the display panel 400, and the inner surface of the sidewall 120 form the communicating first gap 2500 and the second gap 4300 when the glue 60 is not provided. When the glue 60 is provided, the glue 60 fills the second gap 4300 and preferably further fills the first gap 2500. The glue 60 may completely fill the first gap 2500 and the second gap 4300, or the glue 60 may partially fill the first gap 2500 and/or the second gap 4300. If only a portion of the first gap 2500 and a portion of the second gap 4300 have the glue 60 filling therein, the remaining portions of the first gap 2500 and the second gap 4300 are blocked by the glue 60 and do not communicate with each other. In addition, the filling glue 60 secures the display panel 400 inside the back bezel 100 and on the frame body 200, further securing the frame body 200 on the back bezel 100. The glue 60 preferably has a light-resistant property and reduces the amount of light passing therethrough.

On the other hand, the first gap 2500 formed by the metal sidewall 250 adjacent to the light source module 500 and the inner surface of the sidewall 120 is preferably not filled with the glue 60. Similarly, the second gap 4300 at the same side with the first gap 2500 above is not filled with the glue 60, either. In other words, the glue 60 filling in the first gap 2500 formed by three sides of the metal sidewall 250 and three sides of the sidewall 120, and the second gap 4300 formed by three sides of the side surface 430 and three sides of the sidewall 120 is substantially in a U shape.

Except being secured on the back bezel 100 together with the display panel 400, the frame body 200 may be secured independently on the back bezel 100. In detail, the frame body 200 disposed on the back bezel 100 is also well positioned relative to the sidewall 120. For example, the frame body 200 is positioned on the back bezel 100 so that the metal sidewall 250 of the frame body 200 and the sidewall 120 of the back bezel 100 can form a first gap 2500 with an adequate gap size. As FIG. 2A shows, the base plate 110 of the back bezel 100 includes at least a first positioning hole 1100; the bottom 230 of the frame body 200 includes at least a second positioning hole 2300. The shape of the first or second positioning holes can be circle or polygon while the number of the first positioning hole 1100 or the second positioning hole 2300 is preferably two or more than two. Furthermore, the second positioning hole 2300 of the frame body 200, which is disposed on the back bezel 100, is aligned to the first positioning hole 1100. In other words, the first positioning hole 1100 and the second positioning hole 2300 serve to position the frame body 200 on the back bezel 100 when disposing the frame body 200. Specifically, when the number of the first positioning hole 1100 and the second positioning hole 2300 is two, each second positioning hole 2300 is preferably aligned to the corresponding first positioning hole 1100, so that the position and the direction of the frame body 200 relative to the back bezel 100 can be determined. In the embodiment where the shape of the first and second positioning holes is polygon and the number of the first and second positioning holes is one, the frame body 200 can still be positioned relative to the back bezel 100 by aligning the corresponding sides and angles of the polygons. Furthermore, the frame body 200 can be secured on the back bezel by any suitable method such as adhering, welding, or fastening.

Figure 2B:
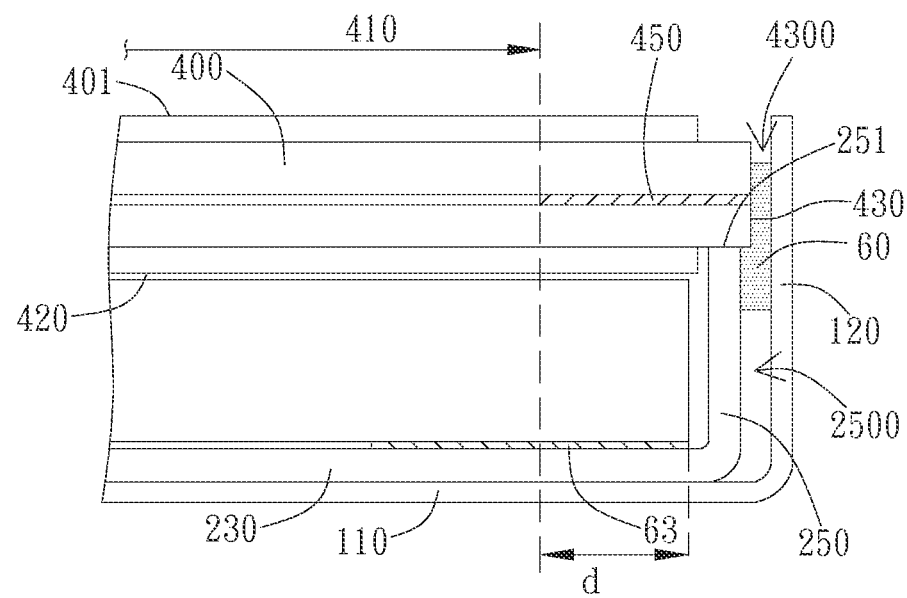
Figure 2C:
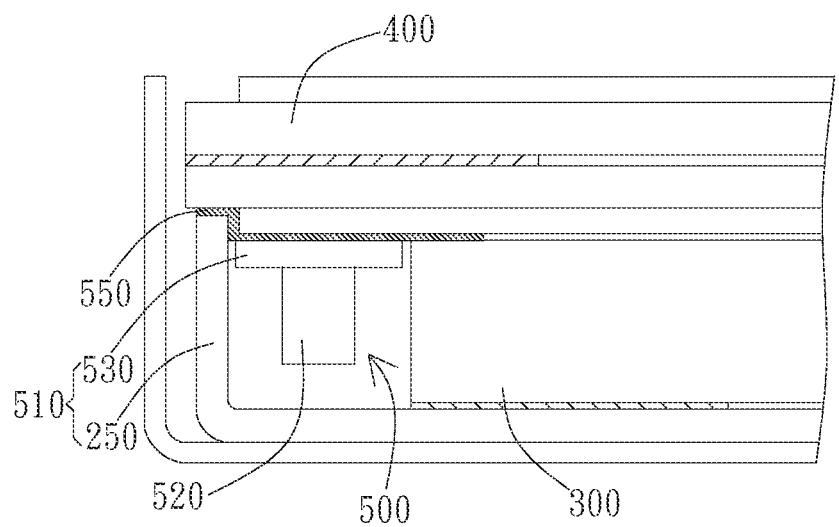

In the embodiments shown in FIGS. 2A-2B, the bottom 230 of the frame body 200 has a plane surface and is secured on the base plate 110 of the back bezel 100 by welding such as spot welding or ultrasonic welding, or adhering with an adhering material 63 such as using a double sided adhesive tape. Furthermore, in other embodiments, the bottom 230 can have a different configuration for securing of the frame body 200 or accommodating the backlight module 300 within the frame body 200. As the embodiments shown in FIGS. 3A-3B, the bottom 230 includes a first bottom area 231 and a second bottom area 232, wherein the first bottom area 231 rises in a direction away from the base plate 110 to form a first space 233 with the base plate 110. The second bottom area 232 surrounds the first bottom area 231 and is adjacent to the metal sidewall 250, wherein the second bottom area 232 contacts with the base plate 110 of the back bezel 100. An inner surface of the first bottom area 231 is preferably a flat surface and is parallel to the base plate 110. The backlight module 300 disposed within the frame body 200 is steadily supported by the first bottom area 231 and forms a second space 234 with the second bottom area 232. In addition, as the embodiment shown in FIG. 3B, a first bonding material 61 is further disposed in the first space 233 to fix the bottom 230 to the base plate 110; a second bonding material 62 is further disposed in the second space 234 to fix the backlight module 300 to the bottom 230. Compared with the frame body having no rising area, the embodiment shown in FIG. 3A-3B, which uses the frame body 200 having the rising area, takes advantage of the space between the back bezel 100 and the frame body 200 by means of the design of the rising bottom 230, the first space 233, and the second space 234 in order to reduce the thickness of the display module 10. For example, the design of rising bottom 230 reduces the thickness of the bottom side of the display module 10; in other ways, the backlight module 300 can be further supported steadily by the first bottom area 231 as being fixed to the bottom 230 of the frame body 200 by the second bonding material 62.

Figure 3A:
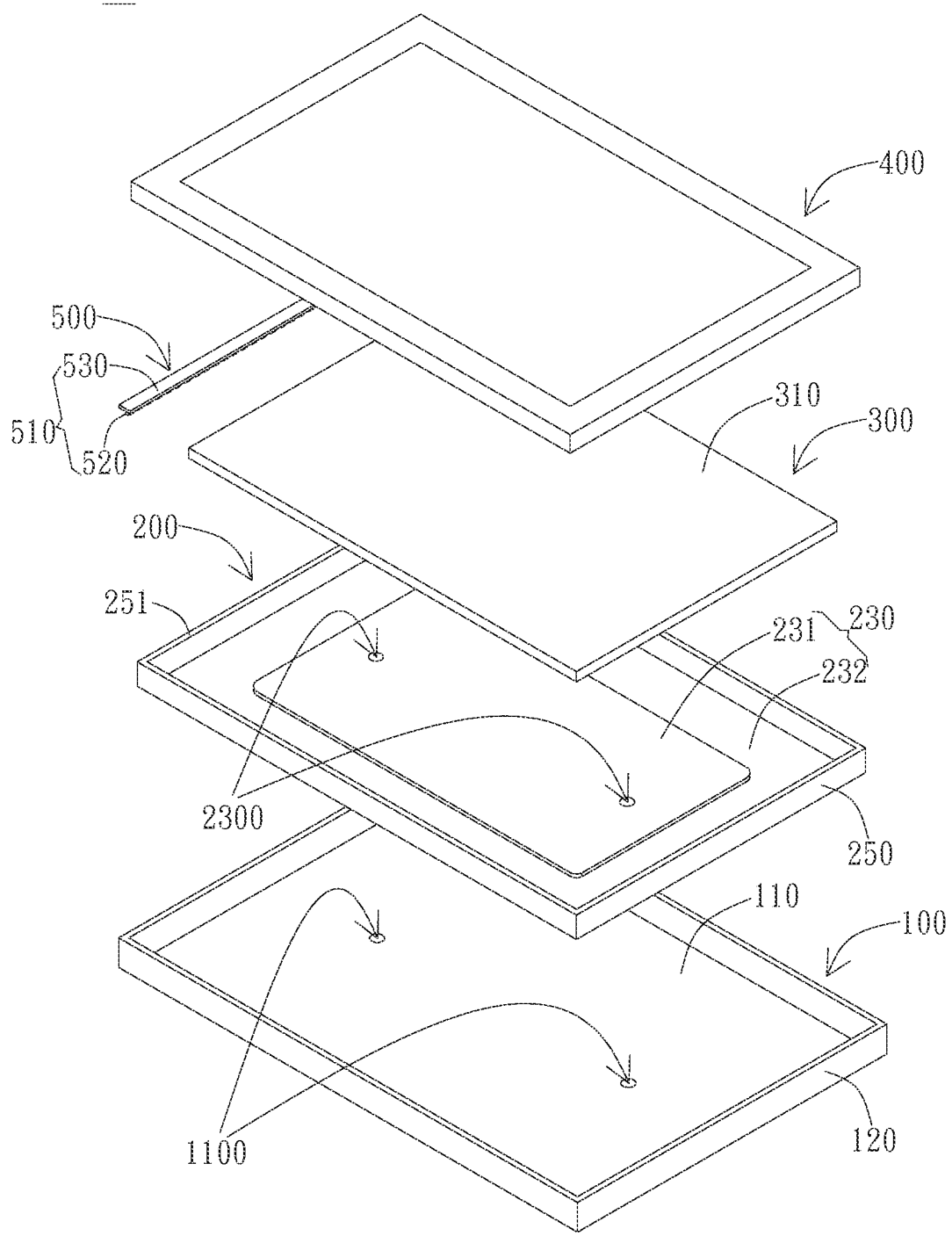
FIGS. 3A-3B are schematic views of another embodiment of the display module of the present invention.
Figure 3B:
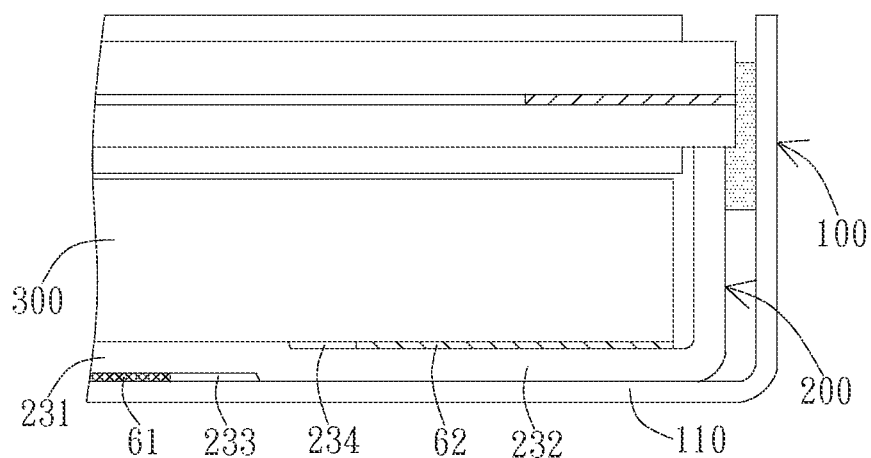
Figure 4A:
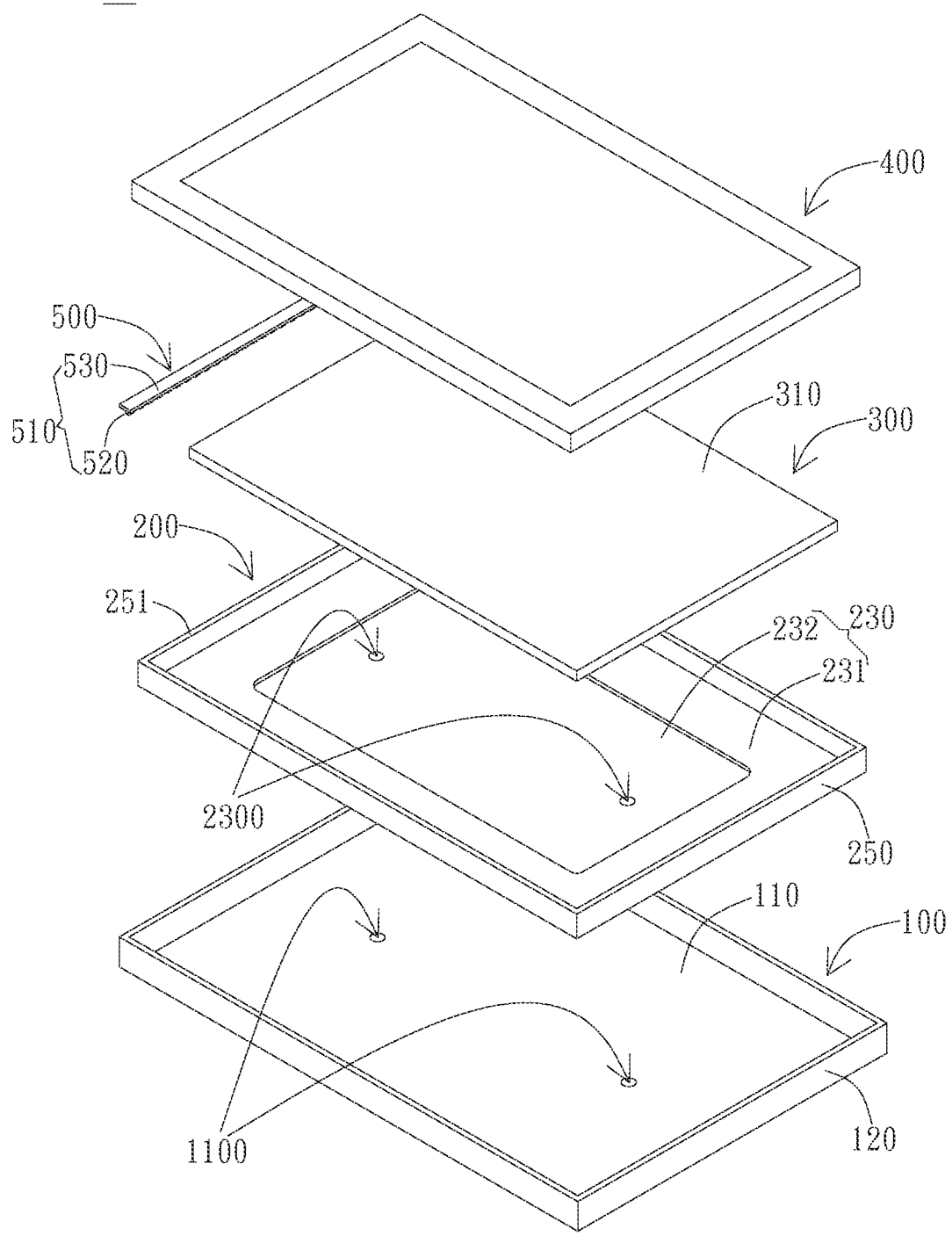
FIGS. 4A-4B are schematic views of another embodiment of the display module of the present invention.
Figure 4B:
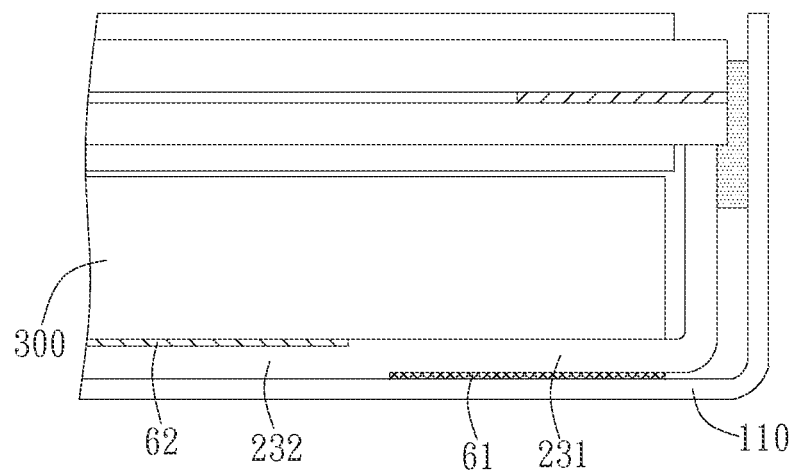
Figure 5:
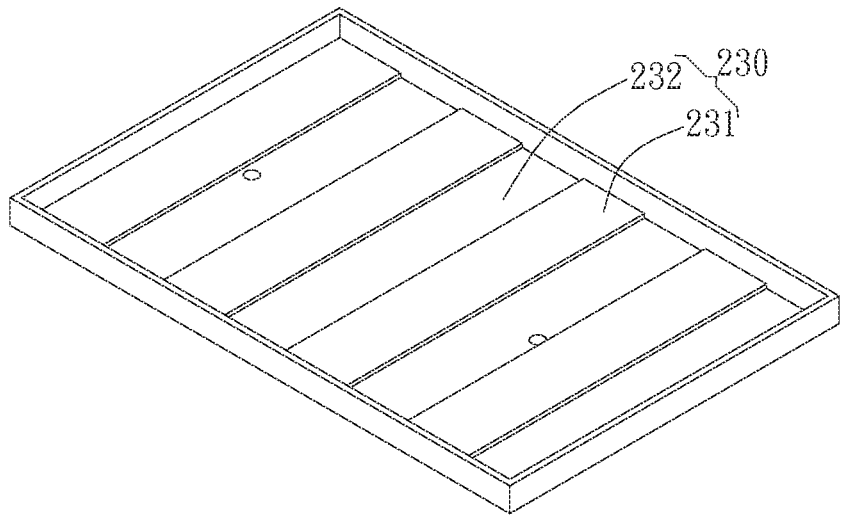
FIG. 5 is a schematic view of another embodiment of the frame body of the present invention.

The configuration of the bottom 230 of the frame body 200 mentioned above, namely the uneven/ups and downs configuration of the first bottom area 231 and the second bottom area 232 provides the enhanced structural strength. In addition, the arrangement of the first bottom area 231 and the second bottom area 232 is not limited to the above-mentioned embodiment. As the embodiment shown in FIG. 4A-4B, it is the first bottom area 231 surrounding the second bottom area 232 and adjacent to the metal sidewall 250. As the embodiment shown in FIG. 5, the first bottom area 231 and the second bottom area 232 are both in strip shape and alternately distributed to form a corrugated bottom 230. Furthermore, as shown in FIGS. 3A, 4A, and 5, since the first bottom area 231 is formed as a shallow trough on the side facing the base plate 110 while the second bottom area 232 is formed as a shallow trough on the side facing the inner side of the frame body 200, the bonding material can be well disposed in these shallow troughs.

Figure 6:
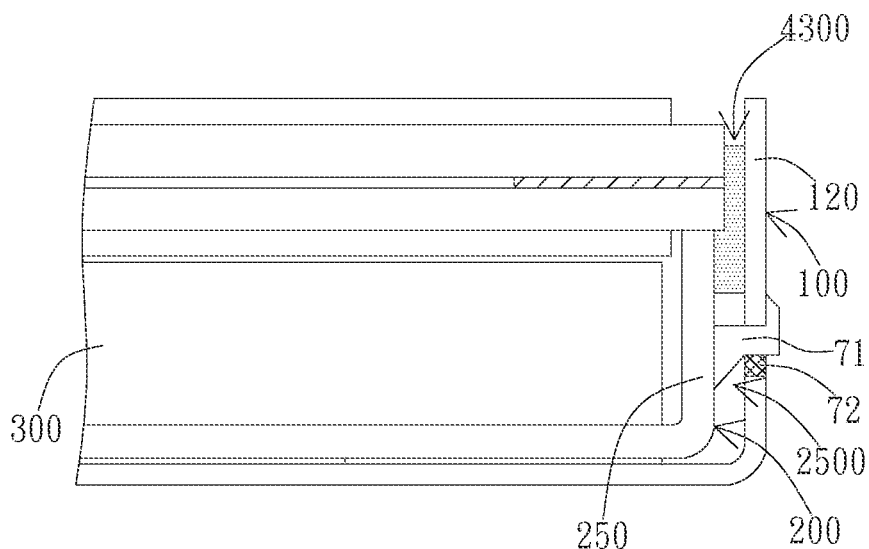
FIG. 6 is a schematic view of another embodiment of the display module of the present invention.

In other embodiments, as shown in FIG. 6, the frame body 200 is secured on the back bezel 100 by means of engagement mechanism of the metal sidewall 250 and the sidewall 120. Specifically, an engaging element 71 such as a hook is disposed on the metal sidewall 250 of the frame body 200. After positioning the frame body 200 on the back bezel 100, the engaging element 71 is engaged with an engaging portion 72 on the sidewall 120, such as a gap, to secure the frame body 200 to the back bezel 100 at a preferred position. Alternatively, the engaging element 71 can be disposed on the sidewall 120 while the engaging portion 72 is disposed on the metal sidewall 250. The engaging element 71 may extend across the first gap 2500 and reach the engaging portion 72. However, the engaging element 71 and the engaging portion 72 are preferably away from the upper portion of the first gap 2500, namely away from the portion of the first gap 2500 close to the second gap 4300. Consequently, even the engaging element 71 reduces the space of the first gap 2500 for receiving the glue 60, the first gap 2500 still provides enough space for receiving the glue 60.

Figure 7A:
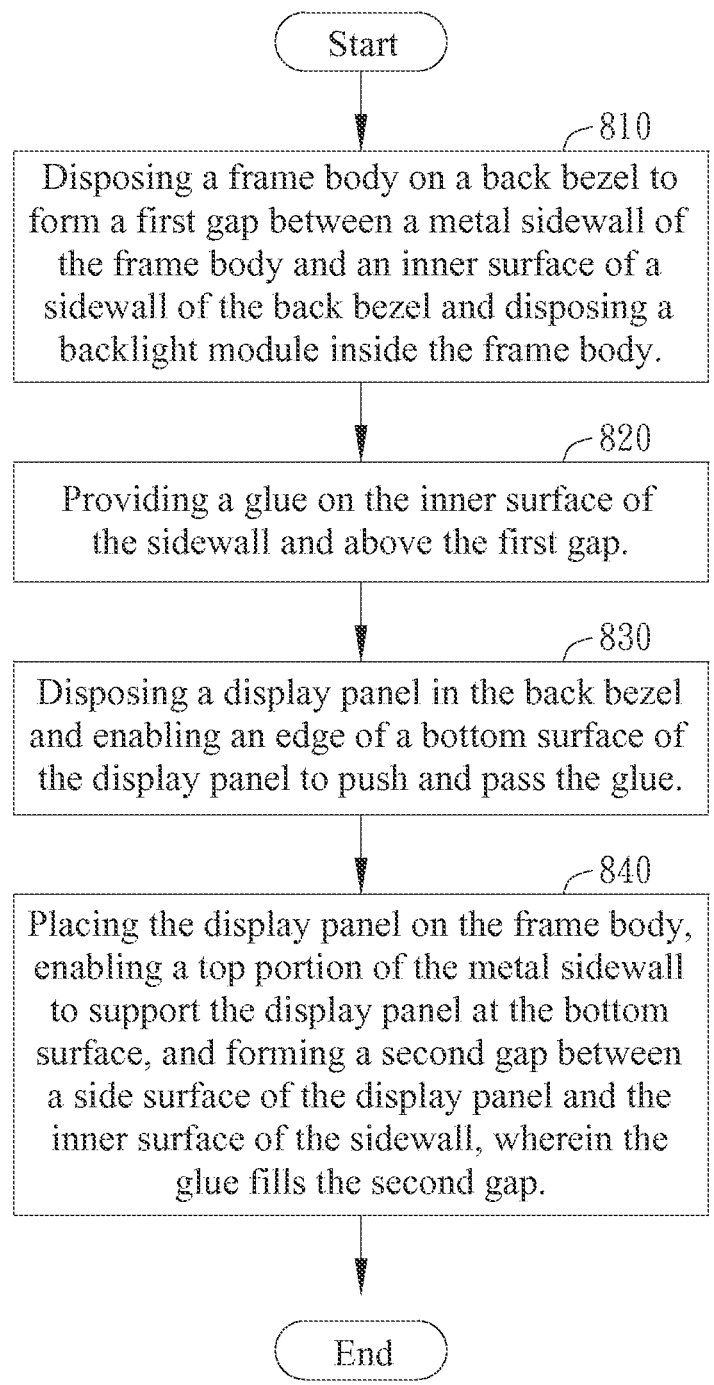
FIG. 7A is a flow chart of the embodiment of the manufacturing method of the display module of the present invention.
Figure 7B:
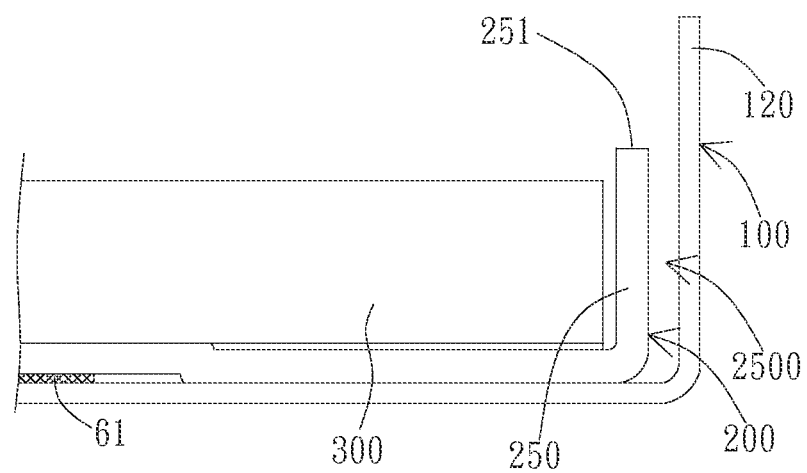
FIGS. 7B-7E are schematic views of the embodiment of the manufacturing method of the display module of the present invention.

The preferred manufacturing method of the display module of the present invention will be described below. As FIGS. 7A-7B and 3A show, a step 810 includes disposing the frame body 200 on the back bezel 100 to form the first gap between the metal sidewall 250 of the frame body 200 and the inner surface of the sidewall 120, wherein disposing the frame body 200 on the back bezel 100 specifically includes positioning the frame body 200 at a predetermined position on the back bezel 100 and then securing the frame body 200 and the back bezel 100 to each other. The step of positioning the frame body 200 is preferably performed by aligning the second positioning hole 2300 on the bottom 230 of the frame body 200 to the first positioning hole 1100 on the base plate 110 of the back bezel 100. The position of the second positioning hole on the bottom 230 determines the width of the first gap 2500 around the frame body 200, wherein the first gap 2500 preferably has a uniform width at least on opposite sides of the display module 10. In addition, during performing the positioning step, a bolt, a pin, or other means which can pass through the first positioning hole 1100 and the second positioning hole 2300 is provided for positioning. The way of securing the frame body 200 on the back bezel 100 includes securing the bottom 230 of the frame body 200 to the base plate 110 of the back bezel 100 by welding such as spot welding or ultrasonic welding, or adhering with an adhering material. Alternatively, the metal sidewall 250 of the frame body 200 can be secured to the sidewall 120 of the back bezel 100 by engagement mechanism, i.e. engaging the engaging element 71 disposed on the metal sidewall 250 with the engaging portion 72 on the sidewall 120 (please refer to FIG. 6).

Figure 7C:
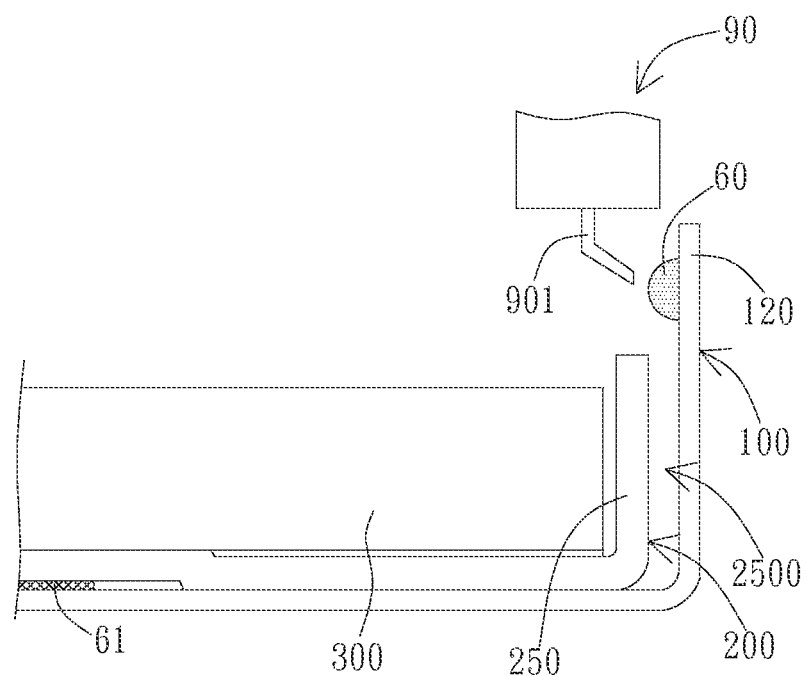

The step 810 further includes disposing the light source module 500 and the backlight module 300 inside the frame body 200, which has been disposed on the back bezel 100. As FIGS. 7A and 7C show, a step 820 includes providing the glue 60 on the inner surface of the sidewall 120 and above the first gap 2500. Specifically, as shown in FIG. 7C, it is preferably to use an XYZ robot and a glue dispenser 90 to provide the glue 60 on the inner surface of the sidewall 120 and above the first gap 2500 along the sidewall 120, wherein the glue may be, for example, room temperature vulcanizing (RTV) silicone. A nozzle 901 of the glue dispenser 90 dispenses the glue along the sidewall 120 at intervals, or moves along the inner side of the sidewall 120 at a constant speed and simultaneously dispenses equal amount of glue 60 on the moving route. In the preferred embodiment, in addition to determining and estimating the amount of the glue 60 by experiment, the height of the glue should be smaller than or equal to the width of the first gap 2500. For example, the width of the first gap 2500 is 0.3 mm while the height of the glue 60 is smaller than or equal to 0.3 mm. Furthermore, in the preferred embodiment, as the glue dispenser 90 dispenses the glue 60 with a discharge pressure of 0.35 Mpa and the XYZ robot moves the nozzle 901 at the speed of 40 mm/s, a preferable amount of glue can be provided on the inner side of the sidewall 120. In other embodiments, the discharge pressure and the moving speed can be adjusted depending on the size of the nozzle. In addition, glue viscosity makes the glue 60 more easily to stay on the inner side of the sidewall 120 and maintain its height.

Figure 7D:
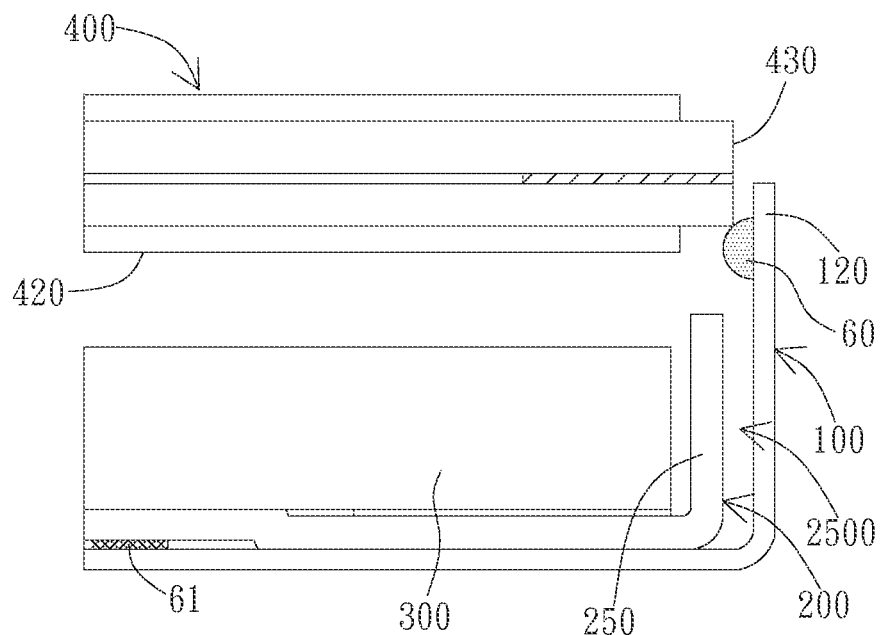

As FIGS. 7A and 7D show, the step 830 includes disposing the display panel 400 in the back bezel 100 and enabling the edge of the bottom surface 420 of the display panel 400 to push and pass the glue 60. In the step 830, a robot arm moves the display panel 400 to be above the frame body 200 and then to move toward the frame body 200 in a manner that the display panel 400 is parallel to the bottom 230 of the frame body 200. In addition, the display panel 400 above the frame body 200 is in a condition that the frame body 200 is totally within the projection area of the display panel 400. After the display panel 400 moves to a degree of starting to enter the accommodation space of the back bezel 100 with the side surface 430 facing the sidewall 120, the display panel 400 will have the edge of its bottom surface 420 pushing and grazing the glue 60 on the inner surface of the sidewall 120, so that part of the glue 60 flows down into the first gap 2500. Accordingly, the side surface 430 of the display panel 400 subsequently gets some glue 60. The glue 60 flowing down into the first gap 2500 is in an amount of filling the first gap 2500 rather than merely flow along the inner side of the sidewall 120. Furthermore, the height of the glue 60 on the sidewall 120 (namely smaller than or equal to the width of the first gap 2500) enables the edge of the bottom surface 420 of the display panel 400 not to push the glue 60 into the frame body 200 to further flow to the backlight module 300 disposed therein. The glue 60 can totally fill the first gap 2500 or fill a portion of the first gap 2500 near the glue-providing position. For example, in the step 820, if the glue 60 is provided with the discharge pressure of 0.35 Mpa and the nozzle speed of 40 mm/s, the glue 60 will appropriately flow and fill the first gap 2500 as mentioned above.

Figure 7E:
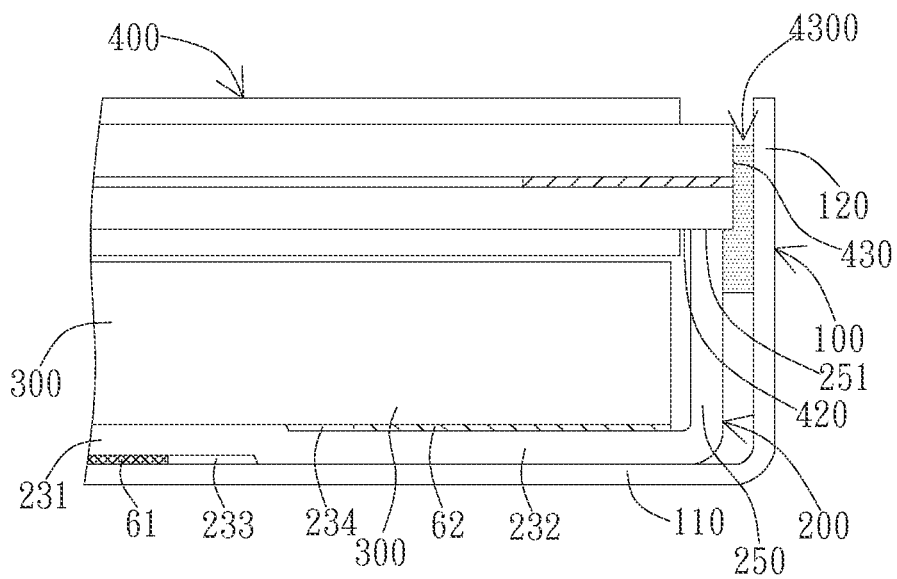

As FIGS. 7A and 7E show, the step 840 includes placing the display panel 400 on the frame body 200, enabling the top surface 251 of the metal sidewall 250 to support the display panel 400 at the bottom surface 430, and forming the second gap 4300 between the side surface 430 of the display panel 400 and the inner surface of the sidewall 120, wherein the glue 60 fills the second gap 4300. In the step 840, the display panel 400 with its side surface 430 getting some glue 60 moves to a degree that the bottom surface 420 is supported by the metal sidewall 250 on the top potion 251 and then stops. Meanwhile, the second gap 4300 having the glue 60 filling therein is formed between the side surface 430 and the inner surface of the sidewall 120. In addition, because that the second gap 4300 is above the first gap 2500 and has a smaller width than the first gap 2500, the glue 60 continuously flows into the first gap 2500 and fills therein when the second gap 4300 is formed.

Figure 8:
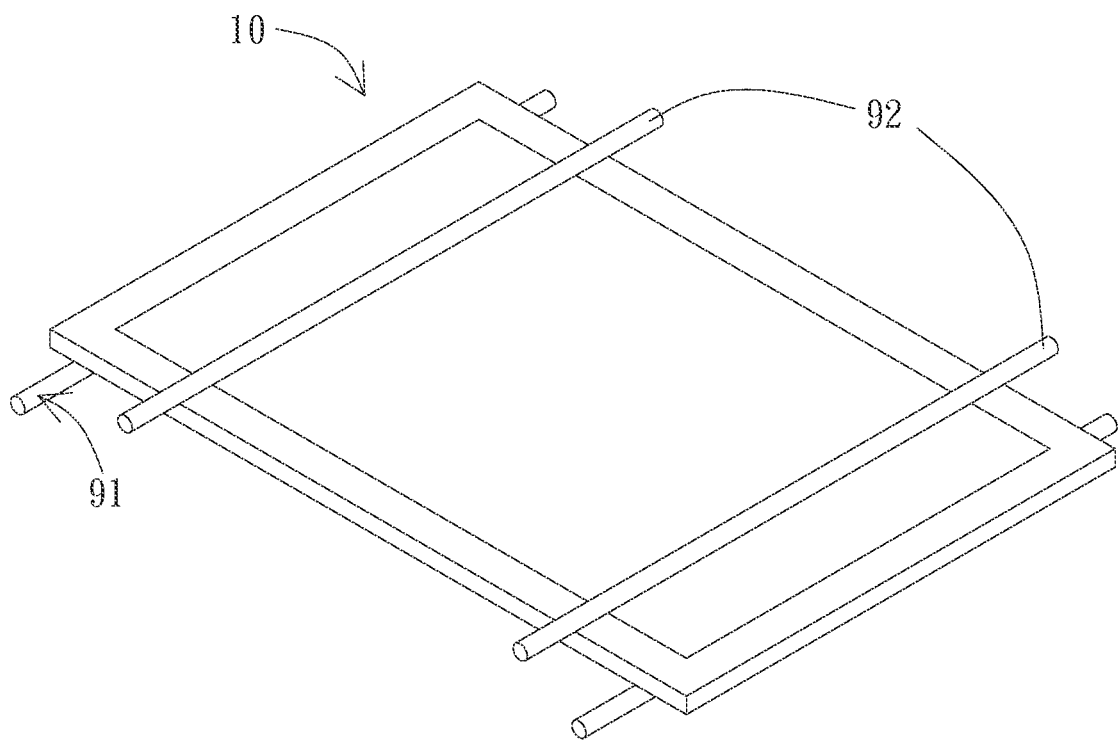
FIG. 8 is a schematic view of strength test.
Figure 9A:
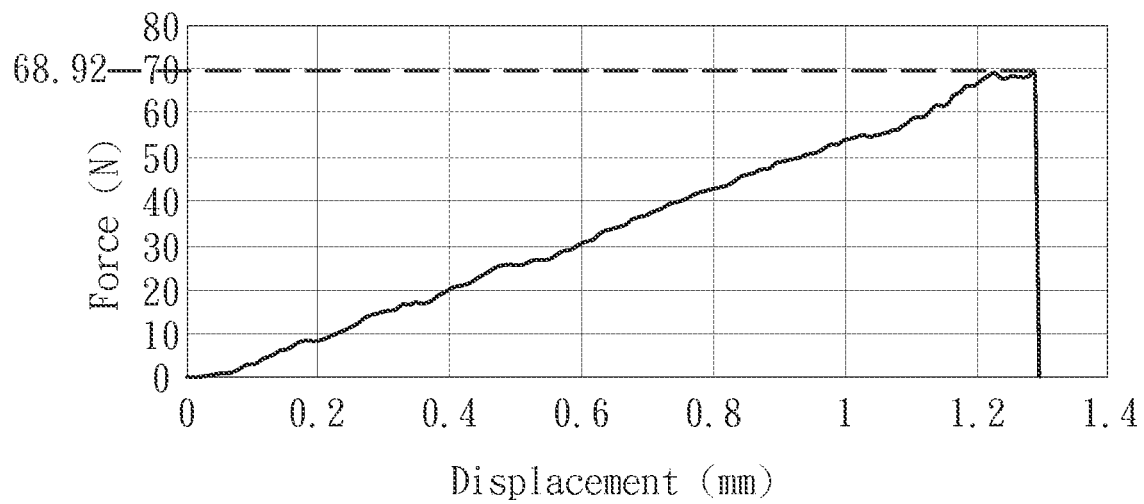
FIG. 9A shows the result of strength test of the display module of the present invention.
Figure 9B:
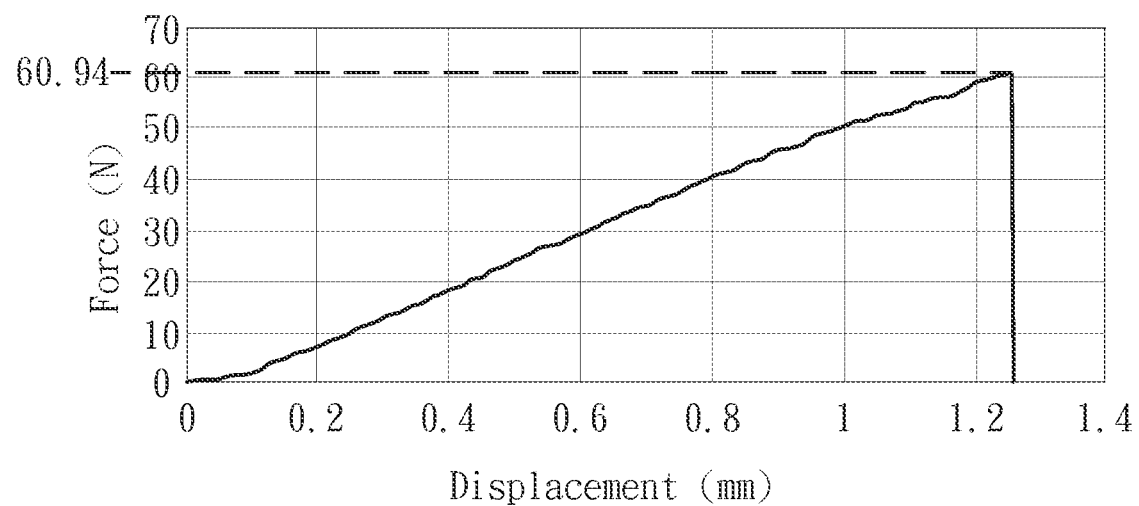
FIG. 9B shows the result of strength test of the conventional display module.

In the preferred embodiment of the present invention, the display module 10 composed of double metal housings of the back bezel 100 and the frame body 200 is formed by the steps 810~840, wherein the display panel 400 is secured to the double metal housings composed of the back bezel 100 and the frame body 200 by the glue 60. In a strength simulation, such as the four points bending simulation shown in FIG. 8, two parallel support spans 91 are under the display module 10, spaced apart and respectively close to the opposite sides of the edge of the display module 10, wherein the support spans 91 have equal distances from their closer sides of the edge, respectively. Two load spans 92 parallel to the support spans 91 are disposed on the display panel 10 and spaced apart. Particularly, the load spans 92 are respectively disposed between the center and the edge of the display module 10 on opposite sides, and have equal distances from their closer sides of the edge, respectively. The load spans 92 exerts force on the display module 10. As FIG. 9A shows, when the force is over 68.92 N, the display glass of the display module 10 will deform or crack. On the other hand, the display glass of the conventional display panel 1 in the four points bending simulation becomes deformed or cracked when the force reaches 60.94 N. Consequently, the structural strength of the display module 10 is 1.15 times stronger than that of the conventional display module 1.

Figure 10A:
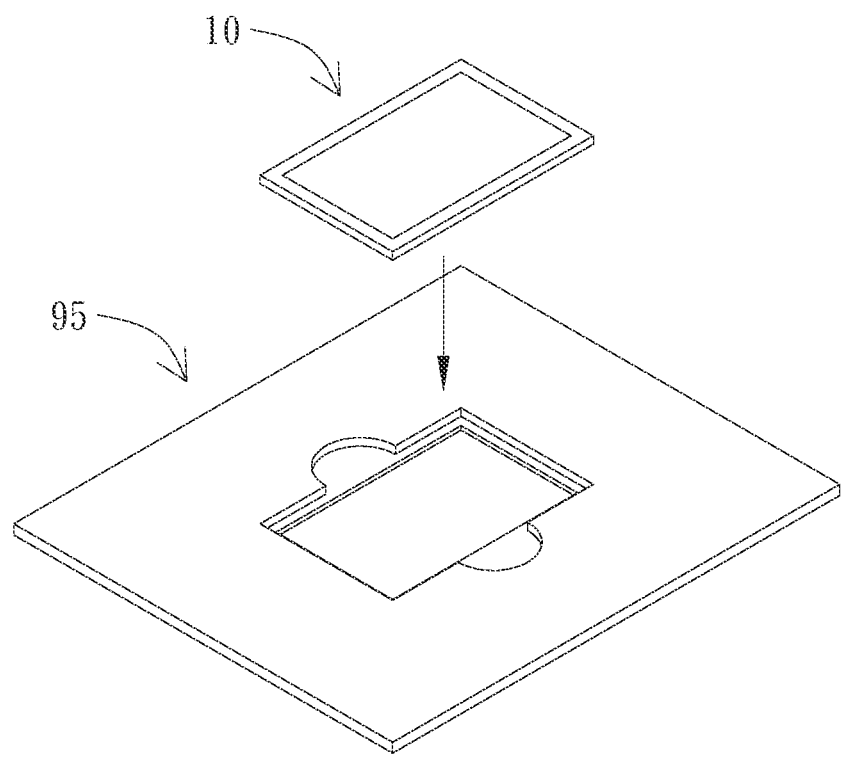
FIGS. 10A-10B are schematic views of another strength test.
Figure 10B:
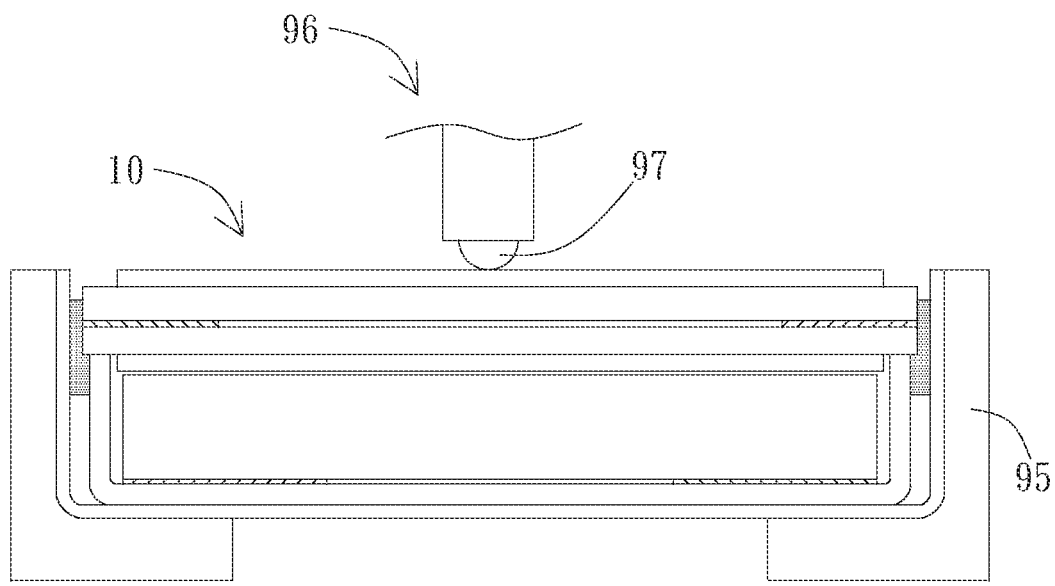
Figure 10C:
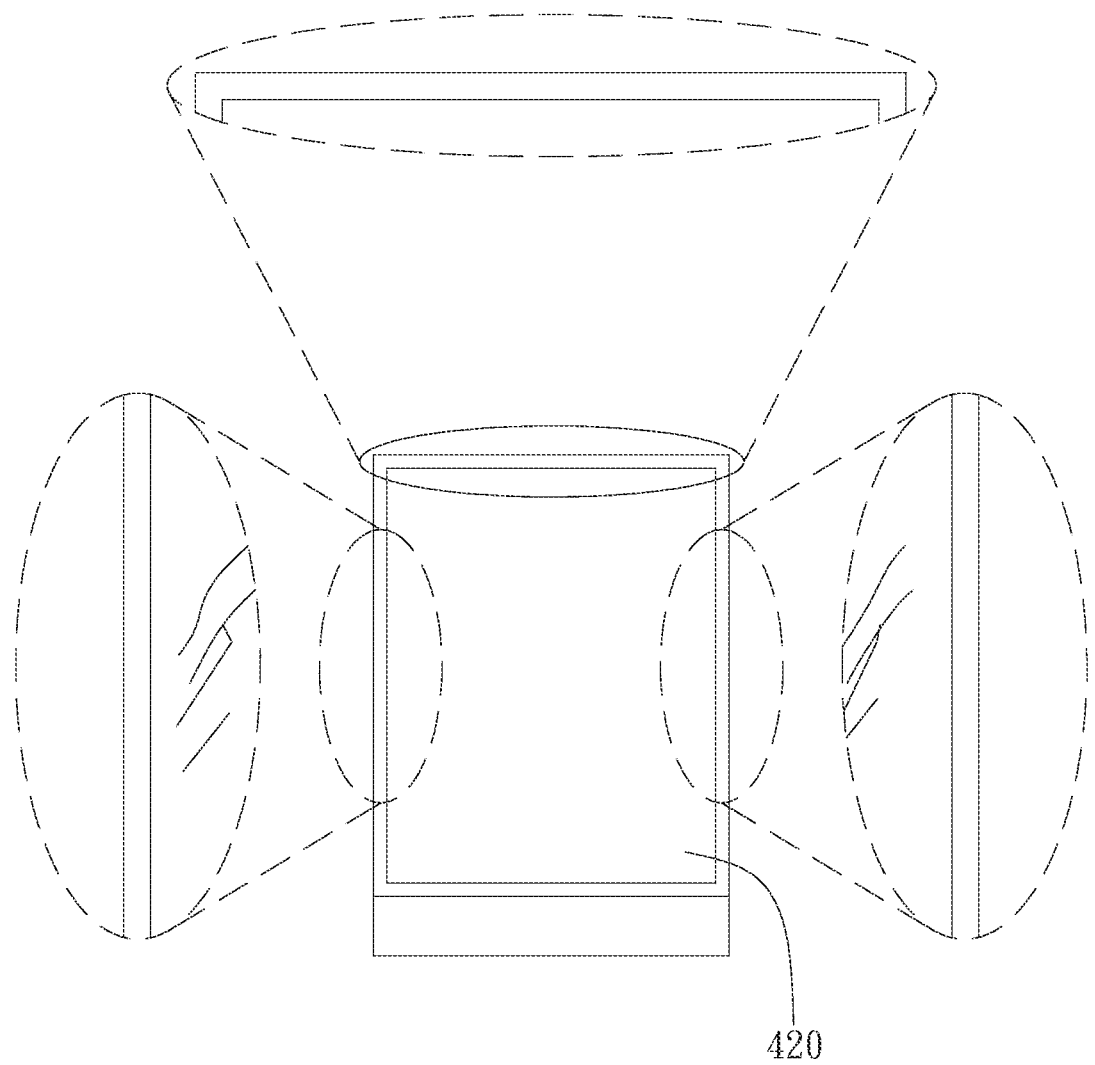
FIG. 10C shows the result of the strength test shown in FIGS. 10A-10B of the display panel of the present invention.

In other strength tests such as the static push test, the results is also positive. As FIGS. 10A-10B show, the display module 10 is supported by a fixture 95 in the static push test. The static push device 96 gradually exerts force on the display panel 400 by contacting against the display panel 400 with a pressing head 97. In the average force of 133.86 N, the display glass cracks, wherein the exerted force is greater than the minimum requirement in the test. In other words, the crack of the display glass of the display panel 400 of the present invention will occur only when the force exerted on the display module 10 is more than 100 N. In addition, as FIG. 10C shows, from the observation of the display glass after the static push test, no crack appears at the frame margin of the display module. That is, the cracks are caused by the pressing head 97 pressing against the central part of the display glass, not resulted from the supporting of the metal sidewall 250.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A display module, comprising:
    a first housing, including a base plate and a sidewall surrounding a periphery of the base plate;
    a second housing, disposed on the first housing, having a metal sidewall, wherein a first gap exists between the metal sidewall and an inner surface of the sidewall;
    a backlight module, disposed in the second housing, having a light-exit surface;
    a display panel, disposed on the second housing and in the first housing with a display surface facing away from the light-exit surface, having a bottom surface and a side surface adjacent to the bottom surface, wherein the display panel is contacted and supported by a top surface of the metal sidewall at an edge of the bottom surface, the side surface faces the sidewall, and a second gap exists between the side surface and the inner surface of the sidewall and communicates with the first gap; and
    a glue, filling the second gap and adhering the sidewall and the side surface.

2. The display module of claim 1, wherein the width of the first gap is greater than the width of the second gap.

3. The display module of claim 1, wherein a part of the glue further fills the first gap, and the glue adheres the sidewall, the side surface, and the metal sidewall.

4. The display module of claim 1, wherein the glue has a light-resistant property.

5. The display module of claim 1, wherein the second housing further includes a bottom, the metal sidewall surrounds a periphery of the bottom, and an outer surface of the bottom faces the base plate.

6. The display module of claim 5, wherein the base plate further comprises a first positioning hole, the bottom further comprises a second positioning hole aligned to the first positioning hole, and the first positioning hole and the second positioning hole have a shape of polygon.

7. The display module of claim 5, wherein the base plate further comprises a plurality of first positioning holes, the bottom further comprises a plurality of second position holes aligned to the plurality of first positioning holes.

8. The display module of claim 5, wherein the bottom is connected with the base plate.

9. The display module of claim 5, wherein the bottom further comprises a first bottom area and a second bottom area, the first bottom area rises in a direction away from the base plate to form a first space with the base plate, the second bottom area is connected with the base plate to form a second space with the backlight module.

10. The display module of claim 9, wherein the second bottom area surrounds the first bottom area.

11. The display module of claim 9, further comprising a first bonding material, wherein the first bonding material is disposed in the first space and fixes the bottom to the base plate.

12. The display module of claim 9, further comprising a second bonding material, wherein the second bonding material is disposed in the second space and fixes the backlight module to the bottom.

13. The display module of claim 1, wherein the metal sidewall has an engaging element disposed at a side of the metal sidewall facing the sidewall, the sidewall has an engaging portion corresponding to the engaging element, and the engaging element and the engaging portion together connect the metal sidewall to the sidewall.

14. The display module of claim 1, further comprising a light source module and a shielding tape, wherein the light source module is disposed in the second housing and between the backlight module and the metal sidewall, the light source module includes a light bar extending along the metal sidewall, and the shielding tape is disposed on a side of the light bar facing the display panel and covers a portion of an outer surface of the backlight module facing the display panel.

* * * * *